Jan. 8, 1952  C. R. ROGERS  2,581,556
TELESCOPIC CAMPING TRAILER
Filed March 23, 1950  4 Sheets-Sheet 1
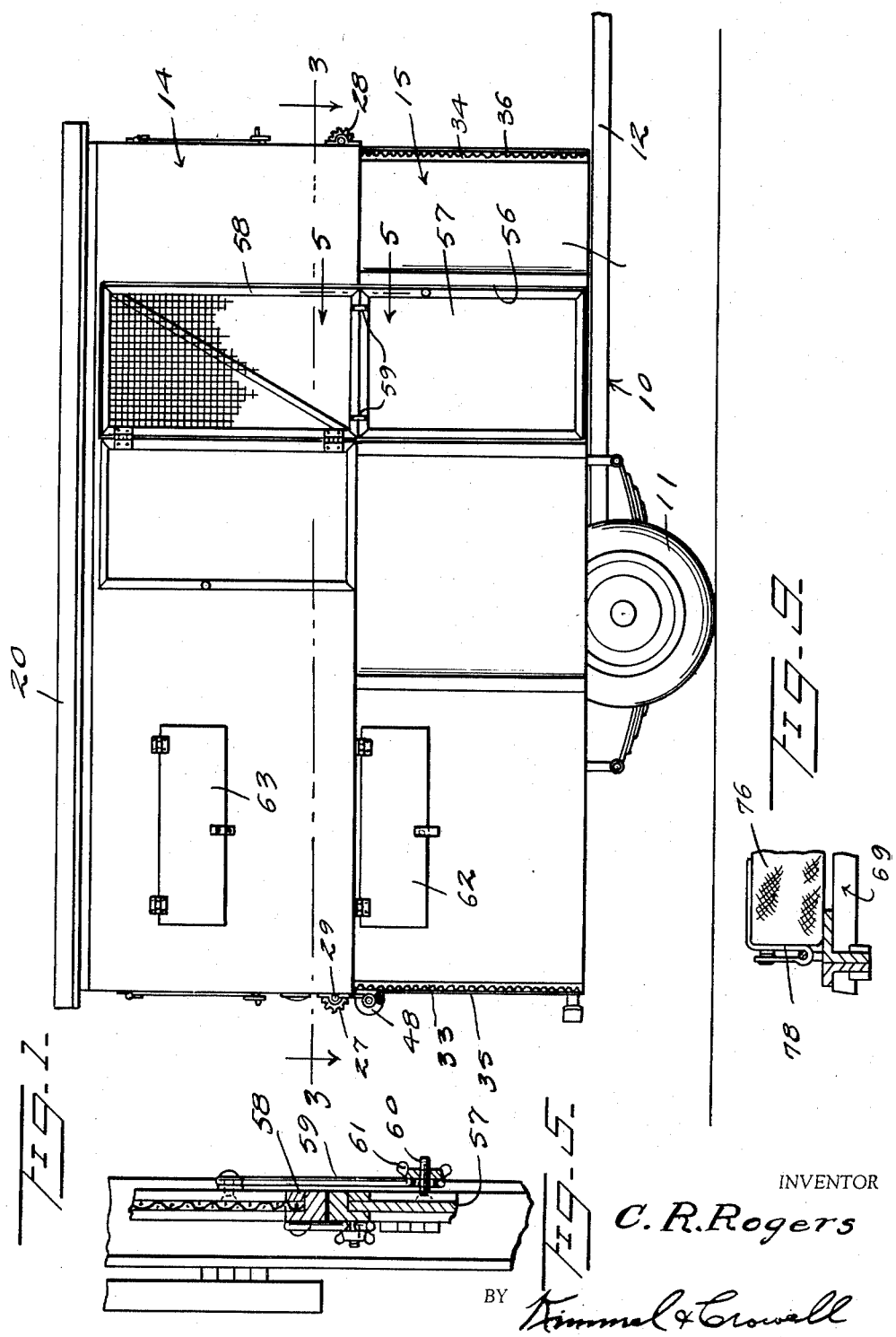
INVENTOR
C. R. Rogers
BY Kimmel & Crowell
ATTORNEYS

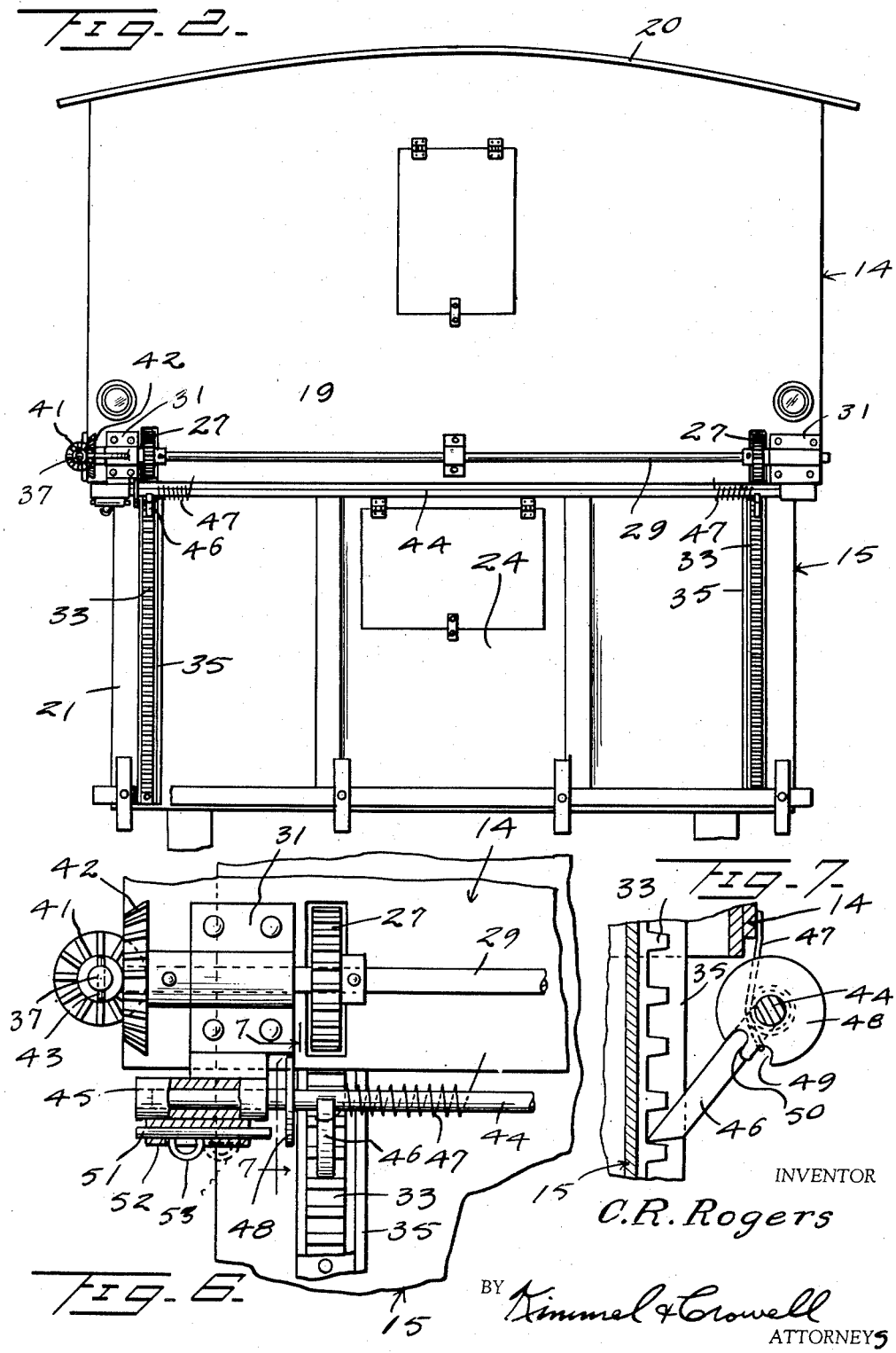

Jan. 8, 1952　　　　C. R. ROGERS　　　　2,581,556
TELESCOPIC CAMPING TRAILER
Filed March 23, 1950　　　　4 Sheets-Sheet 3
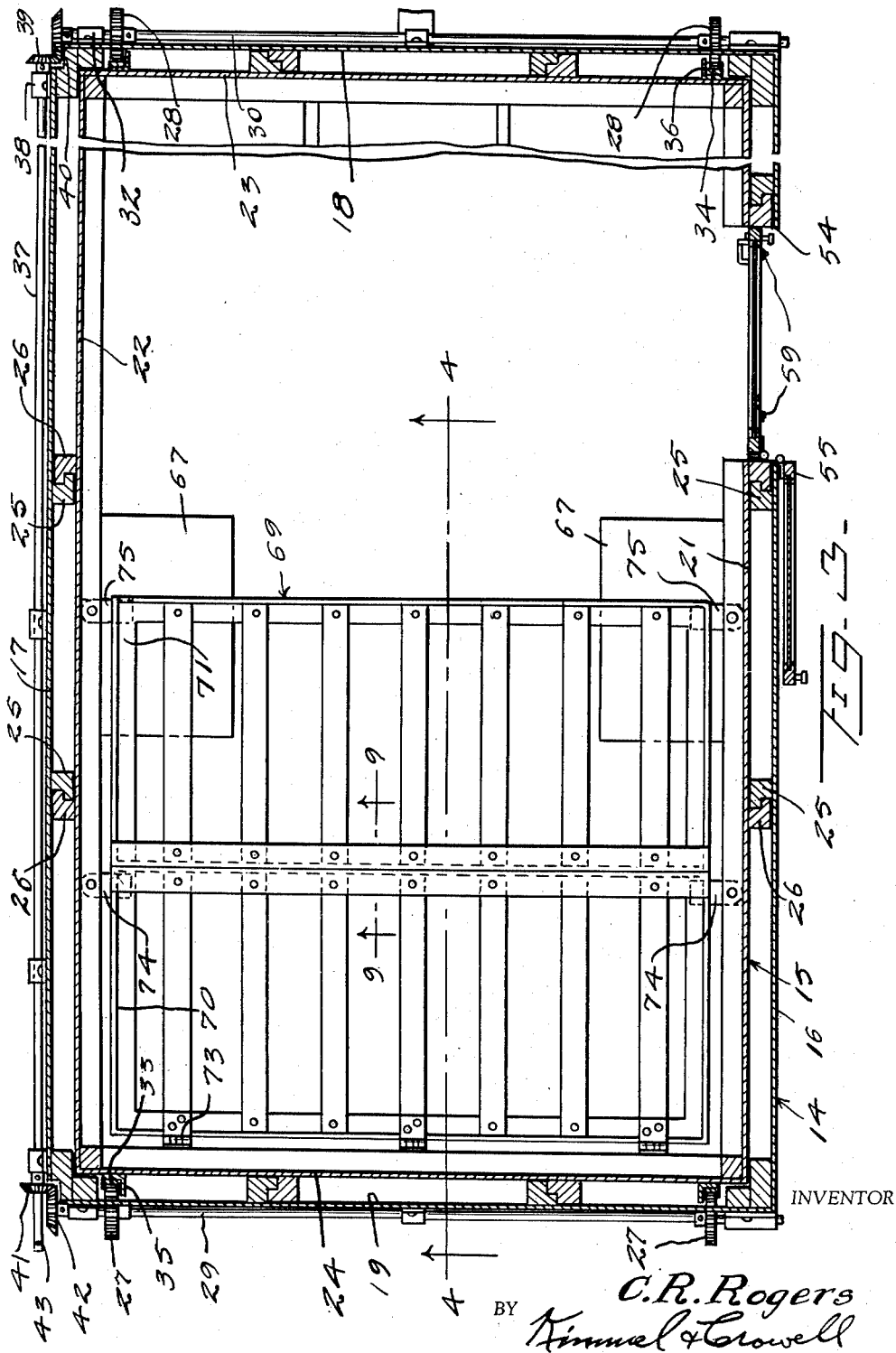
INVENTOR
C. R. Rogers
BY Kimmel & Crowell
ATTORNEYS Jan. 8, 1952          C. R. ROGERS          2,581,556
TELESCOPIC CAMPING TRAILER
Filed March 23, 1950          4 Sheets-Sheet 4
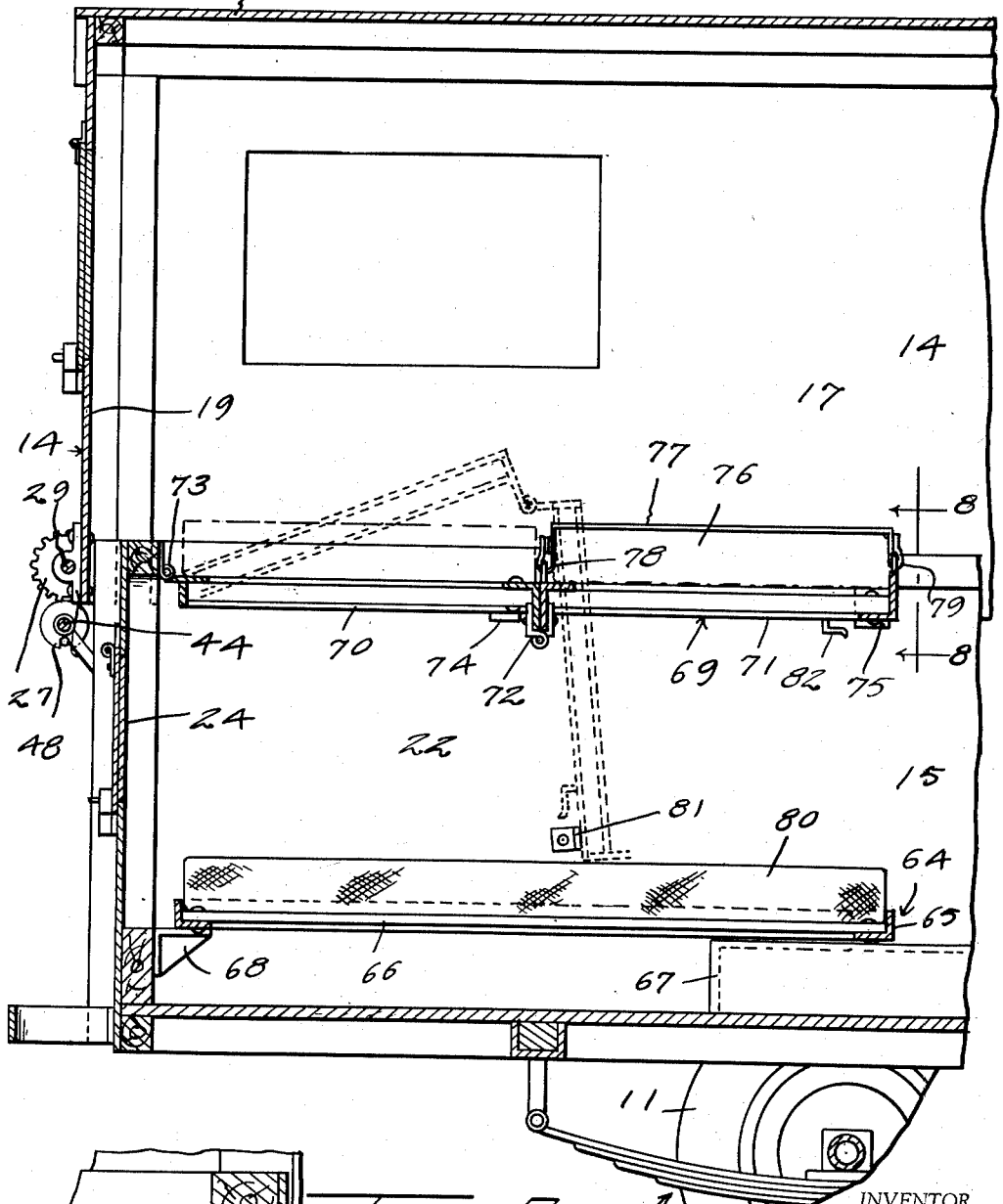
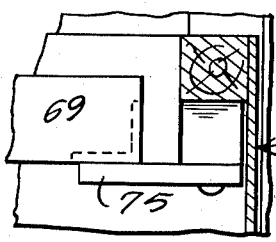
INVENTOR
C. R. Rogers
BY
Kimmel & Crowe
ATTORNEY Patented Jan. 8, 1952

2,581,556

UNITED STATES PATENT OFFICE 2,581,556

TELESCOPIC CAMPING TRAILER

Curt R. Rogers, Gatesville, Tex.

Application March 23, 1950, Serial No. 151,425

1 Claim. (Cl. 296—23)

This invention relates to trailers.

An object of this invention is to provide a trailer of the collapsible body type embodying a pair of telescoping body sections which in their extended position will provide ample head room.

Another object of this invention is to provide in a collapsible type trailer an improved means for extending or collapsing the body sections.

A further object of this invention is to provide in a collapsible trailer body an improved bed structure which can be formed into a divan or a bed assembly with the assembly forming upper and lower beds of the double type.

A further object of this invention is to provide an improved door assembly embodying a removable lower door section which is attachable to an upper door section carried by the upper body member.

With the above and other objects in view, my invention consists in the arrangement, combination and details of construction disclosed in the drawings and specification, and then more particularly pointed out in the appended claim.

In the drawings:

Figure 1 is a detailed side elevation of a trailer constructed according to an embodiment of this invention showing the body sections in extended position.

Figure 2 is a rear elevation of the trailer.

Figure 3 is a horizontal section through the trailer.

Figure 4 is a fragmentary sectional view taken on the line 4—4 of Figure 3.

Figure 5 is a fragmentary sectional view taken on the line 5—5 of Figure 1.

Figure 6 is a fragmentary rear elevation partly in section showing the body section extending or collapsing means.

Figure 7 is a fragmentary sectional view taken on the line 7—7 of Figure 6.

Figure 8 is a fragmentary sectional view taken on the line 8—8 of Figure 4.

Figure 9 is a fragmentary sectional view taken on the line 9—9 of Figure 3.

Referring to the drawings, the numeral 10 designates generally a frame structure provided with traction wheels 11 and a drawbar 12.

The frame 10 has mounted thereon upper and lower telescopically arranged body sections generally designated as 14 and 15. The upper body section 14 telescopes over the lower body section 15 when these sections are in collapsed position so that a relatively low height body or trailer will be provided which may be readily pulled over a highway without undue danger to the tractor vehicle. The upper body section 14 is formed of opposite side walls 16 and 17 and front and rear end walls 18 and 19. A roof 20 is mounted over the side and end walls. The lower section 15 comprises opposite side walls 21 and 22 and front and rear end walls 23 and 24. Pairs of vertically disposed interlocking guide members 25 and 26 are carried by the opposite side and opposite end walls of the upper and lower sections so that these sections may be readily moved upwardly to extended position or moved downwardly to a retracted or collapsed position. The upper section 14 is adapted to be raised or lowered by means of pairs of gears 27 and 28 which are disposed one pair at each end of the upper section and are secured to rear and front gear shafts 29 and 30. The shaft 29 is journalled in bearings 31 which are secured to the rear wall 19 of the upper section, and shaft 30 is journalled in bearings 32 which are fixed to the front wall 18 of the upper section.

The rear wall 21 of the lower section has secured thereto a pair of vertically disposed toothed racks 33 which are fixed to the end wall 21, and the rear gears 27 mesh with the racks 33. The front wall 23 of the lower section has secured thereto a pair of vertically disposed toothed racks 34 with which the gears 28 mesh. Vertically disposed outwardly projecting flanges 35 and 36 are carried by the racks 33 and 34 at their inner edges to maintain the gears 27 and 28 on the racks 33 and 34, respectively.

A longitudinal shaft 37 is journalled in bearings 38 which are carried by the side walls 17, and the shaft 37 has secured to the forward end thereof a bevel gear 39 meshing with a bevel gear 40 secured to the adjacent end of the front shaft 30. A second gear 41 is secured to the rear end portion of the shaft 37 and meshes with a bevel gear 42 which is fixed to the rear shaft 29. The shaft 37 projects rearwardly from the bevel gear 41 and is provided with a transversely disposed pin or key 43 with which a crank handle may be engaged so that shaft 37 may be manually rotated to rotate shafts 29 and 30 in unison.

There is a pawl shaft 44 at the rear end of the upper section 14 which is rockably mounted in bearings 45 projecting downwardly from the bearings 31, and the pawl shaft 44 has fixed thereto a pair of pawls 46 which are spring pressed to a rack engaging position by means of a spring 47 engaging about the shaft 44. The shaft 44 has fixed thereto a disc shaped keeper 48 formed with a pair of notches 49 and 50 for receiving a locking bolt 51 which is slidable in a housing 52 and is movable inwardly to engage in either one of the notches 49 or 50 which is disposed in alignment with a bolt 51. The bolt 51 has a loop or handle 53 secured thereto so that this bolt may be moved inwardly to either lock the pawl shaft against rotation with the pawls 46 engaging the racks 33 or to lock the pawl shaft 44 in a position with the pawls 46 disengaged from the racks 33. The side wall 16 of the upper section 14 is provided with a closure or door opening 54 which is adapted to be closed by means of a hinged door 55.

The lower section 15 is formed with a door or closure opening 56 which is adapted to be closed by a hinged door or closure 58 carried by the upper section 14. When the body sections are in extended position as shown in Figure 1 a lower screen panel 57 is adapted to be secured to the upper panel or door 58 by means of inner and outer hook shaped locking members 59 which in the present instance are carried by the upper panel 58 and are adapted to engage bolts 60 carried by the lower panel or door 57 and to be secured to the bolt 60 by wing nuts 61. The lower section 15 has one or more window panels 62 hingedly secured thereto, and the upper section 14 has one or more window panels 63 hingedly secured thereto. These window panels may be secured to the opposite side and opposite end walls of the body sections.

The lower body section has disposed in the rear portion thereof a lower bed frame 64 which is of rectangular configuration in plan and is formed of an outer angle shaped frame 65 having secured thereto slats 66. The forward portion of the lower bed frame 64 is adapted to engage on the upper side of wheel well 67, and the rear portion of the bed frame 64 engages on supporting brackets 68 disposed at the rear of the lower body section.

An upper bed frame structure generally designated as 69 is disposed above the lower bed frame 64 and includes a pair of hingedly secured together frame sections 70 and 71.

The frame sections 70 and 71 are hingedly secured together by hinge means 72, and the rear frame section 70 is hingedly secured to the upper portion of the rear wall 24 by hinge means 73. The opposite side walls of the lower section 15 have secured thereto inwardly projecting brackets or lugs 74 upon which the forward portion of the rear frame section 70 are adapted to engage, and a second pair of inwardly projecting supporting lugs 75 project from the side walls of the lower section 15 and are adapted to engage beneath the forward portion of the forward frame section 71.

A pair of mattresses 76 is adapted to engage on the upper side of each of the frame sections 70 and 71, and the mattress engaging on the forward frame section 71 is held thereon against outward movement by means of holding straps 77 which engage over the forward mattress and engage through loops or eyes 78 and 79 projecting upwardly from the front and rear sides of the frame section 71. The upper bed structure 69 may be collapsed to provide a divan in cooperation with a mattress 80 which is positioned on the lower bed frame 64 by raising the two frame sections 70 and 71 so that the forward frame section 71 will be disposed rearwardly of the supporting lugs 75 and then dropping the front frame section 71 with the mattress 76 secured thereto to the dotted line position shown in Figure 4.

A pair of inwardly projecting lugs 81 are carried by the opposite side walls of the lower section 15 and hooks 82 carried by the frame section 71 are engageable with the lugs 81 so that the forward frame section 71 will be locked in the vertically inclined position to form the back wall of a divan.

In the use of this trailer structure when the trailer is being moved over a highway the upper section 14 is lowered to a telescoping position over the lower section 15. This is accomplished by partailly rotating shaft 37 to elevate the upper section 14 until dogs or pawls 46 are released from the racks 33. At this time the locking bolt 51 is moved inwardly into keeper notch 50 so that pawl shaft 44 will be held against rotation under the force of spring 47. Shaft 37 may then be rotated to drop the upper section 14 to its lowermost position. It will be understood that at the time the upper section 14 is lowered the panel 57 will be removed from upper door or panel 58. When it is desired to extend the upper section 14 to its operative or extended position shaft 37 is rotated to elevate the upper section 14, and at this time pawl shaft 44 will be unlocked so that the pawls 46 may freely ratchet on the teeth of the racks 33. When the upper section 14 is initially raised the door or closure 55 carried by the upper section 14 is swung to an open position as shown in Figures 1 and 3, and the lower panel 57 which may be either a screen or a solid panel is detachably secured on the lower edge of the upper panel or door member 58.

The trailer body sections hereinbefore described may be formed out of panel wood which will produce a relatively strong wall structure, and, at the same time, the wall structure will be relatively light in weight so that the trailer will not be an undue drag on the tractor vehicle.

What is claimed is:

A trailer comprising upper and lower telescoping body sections, wheels carried by said lower section, a pair of horizontal shafts disposed one at each end of said upper section, bearings for said shafts fixed to said upper section, a longitudinal shaft rotatably carried by said upper section, gears connecting said longitudinal shaft with said pair of shafts, a pair of vertically disposed toothed racks disposed one pair at each end of said lower section and fixed to the latter, a pair of toothed wheels fixed to each of said pair of shafts and meshing with said racks, a spring-pressed pawl shaft at each end of said upper section, a pair of pawls carried by each pawl shaft engaging said racks, and means latching said pawl shafts in pawl released position, said last mentioned means including a disc-shaped keeper having a pair of notches therein mounted on said pawl shaft, and a locking bolt mounted adjacent said disc selectively to lock said shaft in pawl engaged or pawl disengaged position.

CURT R. ROGERS.

REFERENCES CITED

The following references are of record in the file of this patent:

UNITED STATES PATENTS

| Number | Name | Date |
| --- | --- | --- |
| 1,436,984 | Follett | Nov. 28, 1922 |
| 1,521,635 | Lewis | Jan. 6, 1925 |
| 1,852,984 | Smith | Apr. 5, 1932 |
| 2,225,319 | Rollo | Dec. 17, 1940 |
| 2,292,107 | Doepke | Aug. 4, 1942 |

FOREIGN PATENTS

| Number | Country | Date |
| --- | --- | --- |
| 445,040 | Great Britain | Apr. 2, 1936 |